（12）United States Patent
Rancuret et al.

(10) Patent No.: US 10,389,128 B2
(45) Date of Patent: Aug. 20, 2019

(54) POWER CONTROL SYSTEM

(71) Applicants: Rolls-Royce Corporation, Indianapolis, IN (US); Rolls-Royce North American Technologies Inc., Indianapolis, IN (US)

(72) Inventors: Paul M. Rancuret, Indianapolis, IN (US); Russell E. White, Greenwood, IN (US); Michael Quinones, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 310 days.

(21) Appl. No.: 15/279,731

(22) Filed: Sep. 29, 2016

(65) Prior Publication Data
US 2017/0214243 A1    Jul. 27, 2017

Related U.S. Application Data

(60) Provisional application No. 62/286,623, filed on Jan. 25, 2016.

(51) Int. Cl.
*H02J 3/28* (2006.01)
*H02J 3/32* (2006.01)
(Continued)

(52) U.S. Cl.
CPC .................... *H02J 3/28* (2013.01); *H02J 3/30* (2013.01); *H02J 3/32* (2013.01); *H02J 3/38* (2013.01); *H02J 7/0068* (2013.01); *H02J 7/345* (2013.01)

(58) Field of Classification Search
CPC .................................................. Y10T 307/587
See application file for complete search history.

(56) References Cited

U.S. PATENT DOCUMENTS 7,190,133 B2    3/2007    King et al.
8,738,311 B2    5/2014    Wu
(Continued)

OTHER PUBLICATIONS

European Patent Office Extended European Search Report dated Jun. 29, 2017, for Application No. 17153000, Applicants, Rolls-Royce Corporation et al., filed Jan. 25, 2017 (7 pages).
(Continued)

*Primary Examiner* — Fritz M Fleming
(74) *Attorney, Agent, or Firm* — McCracken & Gillen LLC

(57) ABSTRACT

A power control system for providing power sharing is provided. An energy storage device is configured to supply a first portion of power of an electrical power as a total load power and an engine-driven electrical machine is configured to supply a second portion of power of the total load power. A power converter is electrically coupled to the energy storage device and the engine-driven electrical machine such that the power converter is configured to supply the total load power to an electrical load device. A controller is coupled to the power converter and the controller receives characteristic data from at least one of the energy storage device, the engine-driven electrical machine, and the electrical load device. Based on the received characteristic data, the controller determines a power sharing proportion of a power sharing amount of each of the first portion of power and the second portion of power of the total load power to be supplied via the power converter to the electrical load device.

22 Claims, 7 Drawing Sheets

(51) Int. Cl.
    *H02J 3/30*     (2006.01)
    *H02J 7/00*     (2006.01)
    *H02J 3/38*     (2006.01)
    *H02J 7/34*     (2006.01)

(56) References Cited

U.S. PATENT DOCUMENTS

| | | |
|---|---|---|
| 2004/0245783 A1* | 12/2004 | Gilbreth .................... H02J 1/10 |
| | | 290/52 |
| 2009/0118962 A1 | 5/2009 | Heap et al. |
| 2009/0295314 A1 | 12/2009 | Ganev et al. |
| 2009/0312885 A1 | 12/2009 | Buiel |
| 2010/0270864 A1 | 10/2010 | Vyas et al. |
| 2010/0274420 A1 | 10/2010 | Veit et al. |
| 2012/0056474 A1 | 3/2012 | Larson et al. |
| 2013/0253747 A1 | 9/2013 | Amano |
| 2014/0001985 A1 | 1/2014 | Zhang et al. |
| 2014/0103727 A1 | 4/2014 | Taimela et al. |
| 2014/0159365 A1 | 6/2014 | Algrain |
| 2014/0271114 A1 | 9/2014 | Phillips et al. |
| 2015/0191252 A1 | 7/2015 | Cline et al. |
| 2016/0204615 A1 | 7/2016 | Radun et al. |
| 2016/0214737 A1 | 7/2016 | Radun et al. |

OTHER PUBLICATIONS

Chen, Jessie Wenjie, et al., "Hybrid Marine Electric Propulsion System With Super-Capacitors Energy Storage", ASEA Brown Boveri (10 pages).

* cited by examiner

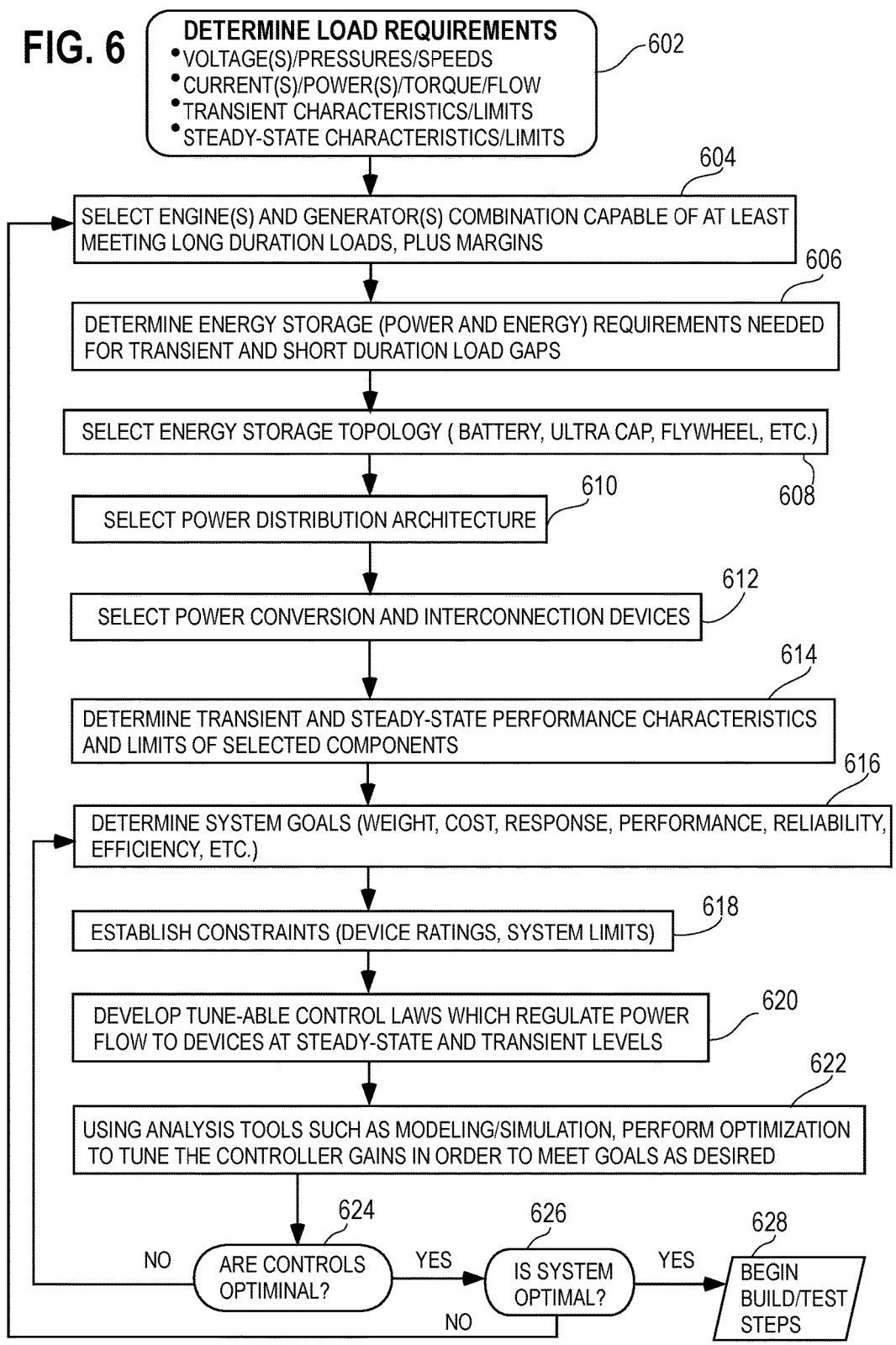

POWER CONTROL SYSTEM

CROSS REFERENCE TO RELATED APPLICATIONS

The present application claims the benefit of U.S. Provisional Application No. 62/286,623, filed Jan. 25, 2016, entitled "Power Control System", the entire contents of which is incorporated herein by reference.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to electrical systems, and more particularly, to power control systems.

BACKGROUND

Power control systems are used as part of electrical power generation. There are different approaches used in power control systems for providing power to the loads in an electrical system. One of the goals in developing a robust power control system is to be able to efficiently and effectively determine a power sharing between the electrical components of the power control system. Traditionally, one of the more common approaches in determining power sharing has involved a droop control method. In this approach, the power sharing is accomplished by using controllers on each energy source or energy storage unit with command values which droop or are adjusted using a curve or algebraic rule dependent on the power flow amount. While the droop control method is relatively simple to implement, it does not offer a level of flexibility and robustness that is desired in determining power sharing during various transient and steady state conditions of the power control system. The load demand put on each electrical component may change drastically depending on whether it is in a steady state or transient condition, and result in system interruptions and electrical component failures. Thus, there is a need for a power control system that provides for power sharing determinations based on the transient and steady state conditions of a system.

SUMMARY

According to one aspect, a power control system for providing power sharing is provided. An energy storage device is configured to supply a first portion of power of an electrical power as a total load power and an engine-driven electrical machine is configured to supply a second portion of power of the total load power. A power converter is electrically coupled to the energy storage device and the engine-driven electrical machine such that the power converter is configured to supply the total load power to an electrical load device. A controller is coupled to the power converter and the controller receives characteristic data from at least one of the energy storage device, the engine-driven electrical machine, and the electrical load device. Based on the received characteristic data, the controller determines a power sharing proportion of a power sharing amount of each of the first portion of power and the second portion of power of the total load power to be supplied via the power converter to the electrical load device.

According to another aspect, a method for providing power sharing in a power control system is provided. The method includes selecting an energy storage device configured to supply a first portion of power of a total load power and selecting an engine-driven electrical machine configured to supply a second portion of power of the total load power. The method further includes selecting a power converter configured to supply the total load power to an electrical load device and providing a controller configured to control the supply of the first portion of power and the second portion of power based on a transient condition and a steady state condition of at least one of the energy storage device, the engine-driven electrical machine, and the electrical load device.

Other aspects and advantages will become apparent upon consideration of the following detailed description and the attached drawings wherein like numerals designate like structures throughout the specification.

BRIEF DESCRIPTION OF THE DRAWINGS

FIG. 6 is a flow diagram of a process for initialization and performance of the embodiment of the power control system.

DETAILED DESCRIPTION

As shown herein a power control system is provided that utilizes a controller in conjunction with an engine-driven electric machine, an energy storage device, and a power converter such that the controller determines a power sharing of a total power to be supplied to a load device. More specifically, the controller receives characteristic data relating to the engine-driven electric machine, the energy storage device, and/or the load device. Based on the received characteristic data, the controller determines a power sharing proportion between a first portion of power provided from the energy storage device and a second portion of power provided from the engine-driven electric machine to be supplied to the load device. As the load device status changes between a transient condition and a steady state condition, the proportion of contribution amount of each of the first portion of power and the second portion of power of the total power is changed. The power control system is also configured to permit a backflow of a third portion of power from the electrical load device to the energy storage device and/or the engine-driven electrical machine.

Figure 1:
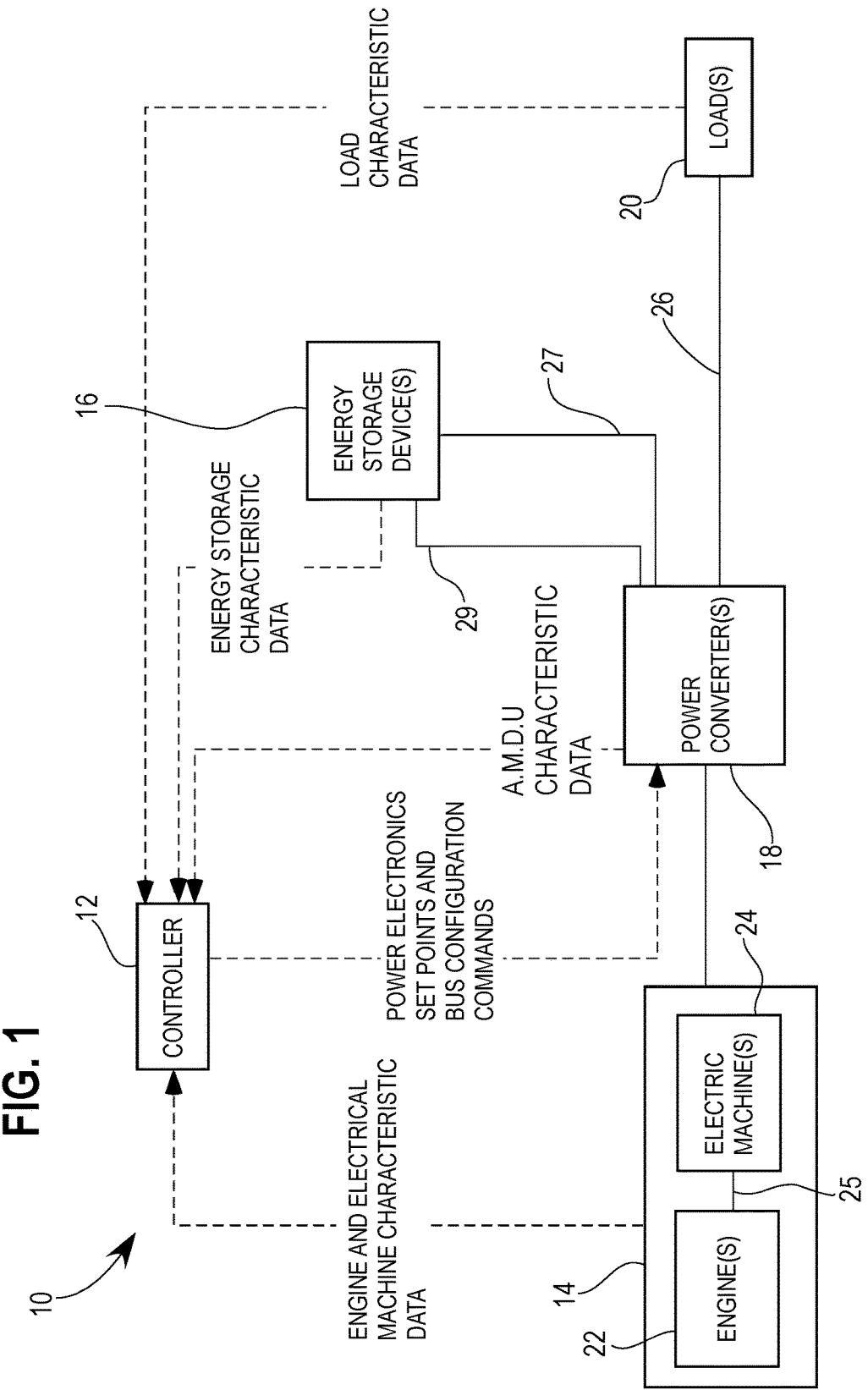
FIG. 1 is a block diagram of an embodiment of a power control system.

Referring to FIG. 1, an example embodiment of power control system 10 includes a controller 12, an engine-driven electric machine 14, an energy storage device 16, and a power converter 18, which in combination provide a total load power to a load device 20. The energy storage device 16 is configured to supply a first portion of power of the total load power and the engine-driven electrical machine 14 is configured to supply a second portion of power of the total load power. The status of the load device 20 may change between a transient condition and a steady state condition. For example, a transient condition may occur during a starting up of the load device 20 when it is coming online or it may be during a powering down when the load device 20 is going offline. Also, other transient conditions may occur when the total power demand by the load device 20 changes based on other operational conditions such as speeding up or slowing down. Examples of load devices 20 may include high power optical loads, thermal management system loads, avionics equipment, and military equipment. As the load device 20 goes through various transient conditions, it eventually reaches or settles into the steady state condition. In the steady state condition, the power demand by the load device 20 is relatively constant and mostly continuous.

The controller 12 of the power control system 10 is coupled to other devices of the power control system 10 such as the engine-driven electric machine 14, the energy storage unit 16, and the power converter 18, and the load device 20 (collectively referred to as "electrical components") and receives information and transmits commands to each of the electrical components. For example, the controller 12 receives characteristic data relating to the individual electrical components 14, 16, 18, 20 of the control system 10. The received characteristic data include specific information about the operational state of the engine-driven electric machine 14, the energy storage unit 16, the power converter 18, and the load device 20. For example, the engine-driven electric machine 14 which comprises at least one engine 22 and at least one electric machine 24 provides characteristic data that may include information regarding the operational status of the engine 22 and the electric machine 24 such as the rpm, cycle temperatures, fuel flow, voltage, and instantaneous maximum power of the engine-driven electric machine 14. Similarly, the energy storage device 16 may provide characteristic data regarding the energy storage states, voltage, charge percentage, current, and instantaneous maximum power of the energy storage device 16 among others. Also, characteristic data regarding the load device 20 provided to the controller 12 may include, for example, the total load demand via various mechanisms (not shown) such as sensors, feedback devices, estimators, or load anticipation units.

The controller 12 utilizes either real-time or anticipated information about the load device 20 load magnitude, in addition to the real-time status of the engine-driven electric machine 14 and the energy storage device 16 in order to determine optimal power splits between the engine-driven electric machine 14 and the energy storage device 16 with tunable behavior at both the steady state and transient conditions. It should be noted that the terms power sharing or power split are used herein interchangeably and refer to the percentage of power flowing to/from the engine-driven electric machine 14 versus the power flowing to/from the energy storage device 16 relative to the total load demand by the load device 20.

In the engine-driven electric machine 14 of the power control system 10 of FIG. 1, the engine(s) 22 drive the electric machine(s) 24 with a number of shafts 25. The energy storage device(s) 16 are connected to the power converter(s) 18 with a number of electrical connections 27 and/or mechanical linkages 29. Additionally, the load device(s) 20, in this example, are connected to electrical load buses 26, and the power converters 18 include power conversion devices and interface connections (not shown). The power converter 18 may selectively include an active machine drive unit (described below). For example, the active machine drive unit transfers power between the engine-driven electric machine and the load bus 26 that supplies the total power to the load device. The controller 12 regulates power flow between the various power control system electrical components 14, 16, 18, 20 by, for example, assigning set-point commands to the power conversion device(s). The controller 12 provides commands to the power converter 18 to re-configure electrical bus or mechanical linkage connections of the power control system 10 to accomplish power sharing in supplying the load device 20 power demand. The control system 10 may also include relays, switches, contactors, disconnects, breakers, fuses, clutches, or some other means (not shown) for achieving multiple electrical bus connections or mechanical linkage configurations. The engine 22 may be any device providing one or more rotating shafts for power extraction, such as a gas turbine engine, reciprocating engine (diesel or gasoline), or some other engine architecture.

The power control system 10 in the example embodiment of FIG. 1 may experience highly transient loads. When utilizing both of the engine-driven electric machine 14 and energy storage device 16 in the power control system 10 with highly transient loads, power flow is directed to/from the energy sources/sinks in a manner which optimizes efficiency, reliability, cost, and size considerations. The controller 12, in this example, determines a power flow response of the power control system 10 over various types of loading arrangements and system state/conditions. The controller 12 is used to determine the power flow split behavior as a function of the load device 20 total load demand, the energy storage unit 16 states, and the engine-driven electric machine 14 states. The controller 12 may also be configured to specify these behaviors at various frequency ranges, so that an optimization can be done when determining how the power split demand changes in time. More specifically, transient conditions may be categorized as different dynamic rates or frequencies. For example, fast transients are considered high frequency while relatively slower transients are considered medium frequency transients. An example of a high frequency transient may be an energy storage device which is to be charged and discharged very rapidly such as an ultra-capacitor or a flywheel.

In the example embodiment of FIG. 1, the controller 12 determines a power sharing amount of a first portion of power from the energy storage device 16 and a power sharing amount of a second portion of power from the engine-driven electric machine 14 based on a status of the electrical load device 20. The controller 12 is configured to identify when the status of the electrical load device 20 is either in a transient condition or a steady state condition. During a transient condition that corresponds to an increase in power demand of the electrical load device 20, the controller 12 allocates a larger power sharing amount of the first portion of power to be supplied from the energy storage device 16 than during the steady state condition. In contrast, during the steady state condition, the controller 12 allocates a larger power sharing amount of the second portion of power to be supplied from the engine-driven electrical machine 14 than during the transient condition. Also, during the steady state condition, the controller 12 allocates a larger power sharing amount from the engine-driven electrical machine 14 than from the energy storage device 16. In the steady state condition, the energy storage device 16 is recharged to a predetermined value over an energy storage device time constant period.

As seen, the power control system 10, FIG. 1, allows the power contribution of the energy storage device 16 to be selectively tuned such that the energy storage device 16 is used to the extent as needed by the engine-driven electric machine 14. For instance, the energy storage device 16 charge/discharge time constants can be tuned to correspond to response time constants of the engine 22, ensuring that stress on the engine 22 is minimized during load step changes. The amount of power contribution the energy storage device 16 provides throughout a time window may be set explicitly as a function of the state of the power control system 10. For example, when a transient condition or response has settled out, the controller 12 determines the power flow split based on a comparison of the received characteristic data with the stored predetermined parameters in a memory according to a set of rules (described in detail below). By doing so, energy storage levels in the energy storage device 16 may reach a desired balance point within a desired amount of time without using charge/discharge rates which could cause excessive stress on the energy storage device 16.

As provided herein, multiple sets of rules for multiple time constants are utilized by the controller 12, FIG. 1, to create the desired power splits at varying lengths of time. More specifically, various implementations of the controller 12 may be provided to adaptively process power sharing determinations based on a preselected sets of rules. For example, the following rule sets may selectively be implemented by the controller: rule set 1.1) rules to determine power split at steady state, which generate a desired power split as a function of the load demand, and some or all of the known states of the engine 22, electric machine 24, energy storage device 16, and power converter 18; rule set 1.2) rules to determine power split during transient conditions, which generate a desired power split as a function of the load demand, and of some or all of the known states of engine 22, electric machine 24, energy storage device 16, and power converter 18; and rule set 1.3) rules for determining how to balance or transition between the effects of the above rules as the load demand and the system states change between steady state and transient conditions at various response rates.

In addition, to the aforementioned rule sets, the controller 12, FIG. 1, may also selectively utilize one or more additional rule sets or features as follows: rule set 2.1) rules to limit power flow in/out of the engine-driven electric machine(s) 14 based on device limitations, such as maximum power rating, maximum temperature limits, max torque limits, among others; rule set 2.2) rules to limit power flow in/out of the energy storage device(s) 16 based on device limitations, such as maximum current rating, min/max state of charge, min/max voltage, maximum temperature, among others; feature 2.3) features which shift the power split rules mentioned in rule sets 2.2 and 2.3 during conditions where one or more of the electrical components of power control system 10 reach their operational power limits, in order to still meet the load demand for as long as possible; feature 2.4) features which produce a notification if the load demand cannot be met with any combination of the engine-driven electric machine 14 and energy storage device 16 in their present states; feature 2.5) features which produce a notification if any of the engine 22, electric machine 24, energy storage device 16, or power converter 18 states exceed normal operating limits; feature 2.6) features which either regulate voltage or prevent exceeding voltage limits on any load bus by adjusting an overall device/electrical component power flow amount in relation to the load demand; feature 2.7) estimator/observer algorithms which estimate engine 22, electric machine 24, energy storage device 16, or power converter 18 states using a limited set of measurements, instead of sensors measuring them directly; and feature 2.8) features which re-configure bus connections to allow for multiple power flow arrangements based on various state criteria of the power control system 10, in which contactors, switches, or some other means are provided to allow multiple bus connection arrangements.

Figure 2:
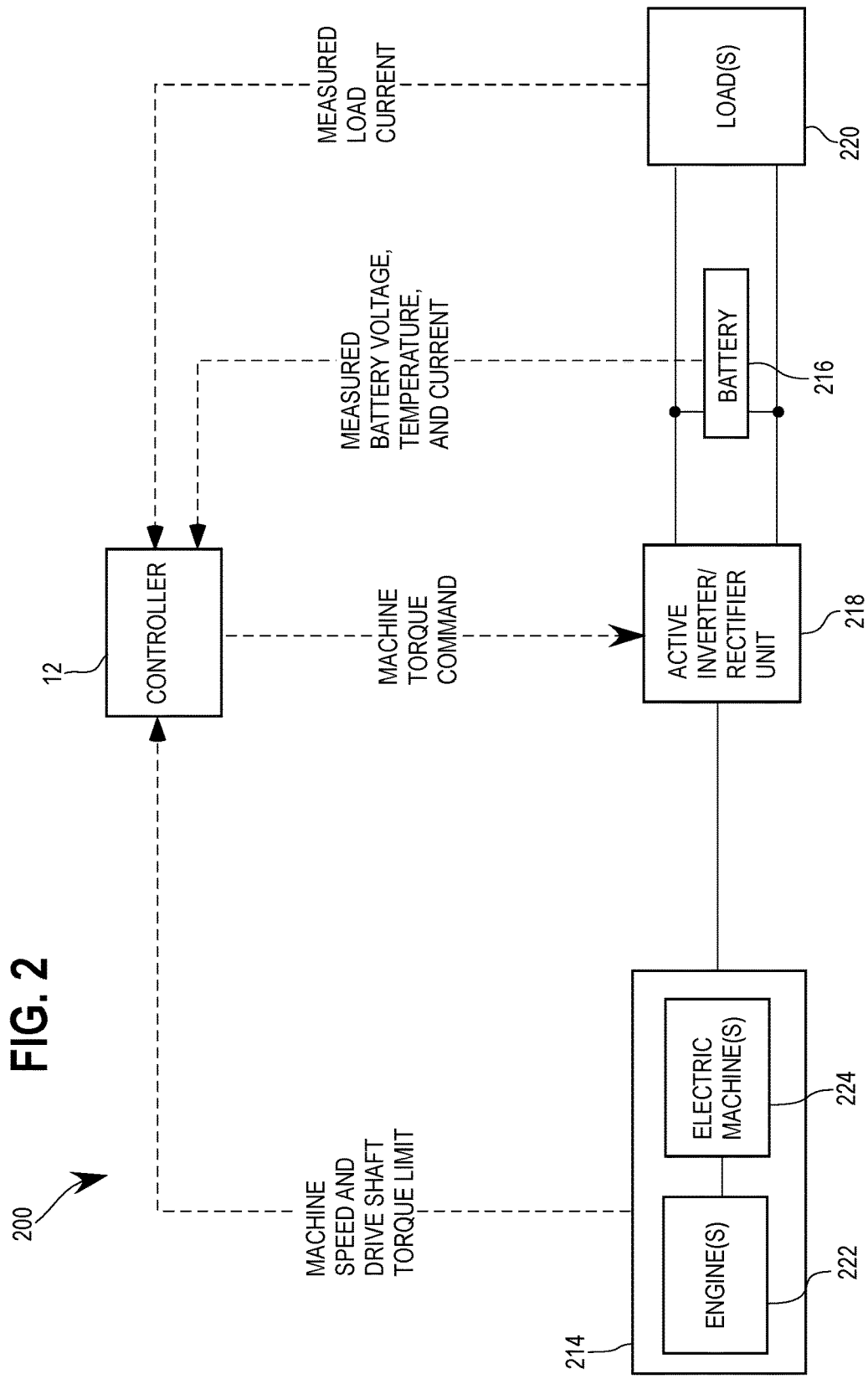
FIG. 2 is a block diagram of another embodiment of a power control system.

Referring to FIG. 2, an alternative embodiment of power control system 200 is shown. In this embodiment, a battery 216 is used as a form of the energy storage device, and the battery 216 is attached directly to a direct current (DC) bus 226 from which the load device 220 draws power. As a form of the power converter 18, an active (pulse width modulated) inverter/rectifier unit 218 having power electronics is used as an interface between the DC bus 226 and the engine-driven electric machine 214 terminals. In this embodiment, the battery 216 may utilize Li-Ion, NiMH type or other battery chemistries known to those skilled in the art. A desired power flow split determined by the controller 212, FIG. 2, is effected by providing a machine torque command to the power electronics of the active inverter/rectifier 218 to drive the load device 220. In this manner, a certain amount of power is provided from the engine-driven electric machine 214, while the remaining power is provided from the battery 216. Alternatively or in addition to a battery 216, FIG. 2, super-capacitors or ultra-capacitors (not shown) may be used in this embodiment. Capacitors typically provide higher power flow capability compared to batteries; however, capacitors provide lower energy storage capability relative to batteries. Therefore, in some circumstances a parallel combination of battery and capacitor may be used, as this arrangement can provide a desired amount of stored energy from the battery 216, while maintaining a desirable high-frequency power capability of the capacitor. This arrangement further provides some redundancy if the battery is taken offline.

Figure 3A:
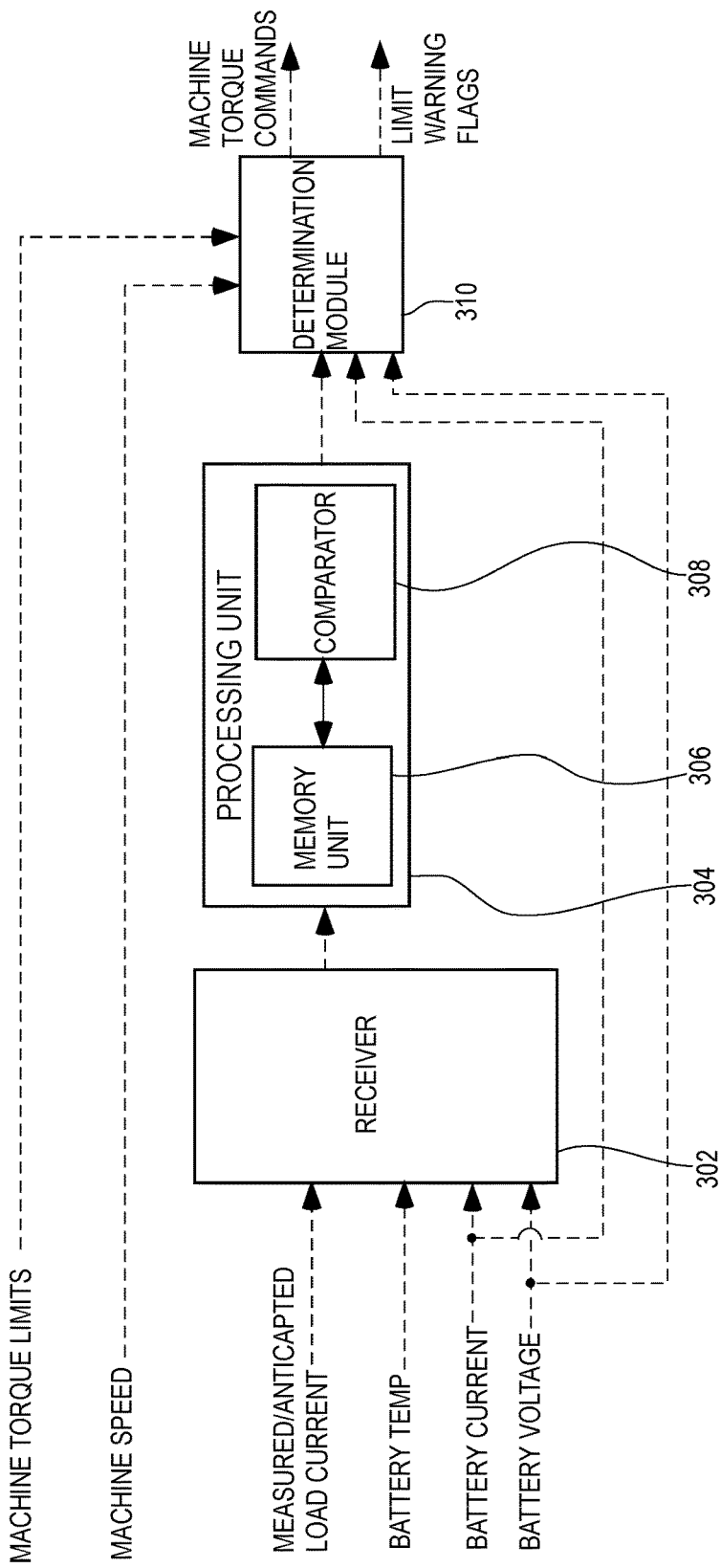
FIG. 3A is a block diagram of an embodiment of a controller shown in FIG. 2.

Referring now to FIG. 3A, a block diagram of the controller 12 according to the embodiment of the power control system 200 in FIG. 2 is shown. The controller 12, in this example embodiment, includes a receiver 302, a processing unit 304 having a memory unit 306 and a comparator 308, and a determination module 310. Various characteristic data are provided as inputs to the receiver 302 of the controller 12. For example, in the embodiment of the power control system 200, FIG. 2, the receiver 302, FIG. 3, of the controller 12 receives inputs that may be, among others, a battery voltage, a battery current, a battery temperature, and a measured or anticipated load current. The inputted characteristic data are processed through the processing unit 304 that is coupled to the receiver 302 by using the combination of the data stored in memory unit 306 and the comparator 308. More specifically, the memory unit 306 has stored therein predetermined parameters and values which are associated with the operational limits of the electrical components of the power control system 200 such as the engine-driven electrical machine 214, the battery 216, active inverter/rectifier unit 218, and the total load device 220.

During operation of the load device 220, the load power demand is satisfied by the engine-driven electric machine 214 and the battery 216. Depending on the status of the load device 220, whether in a transient condition or steady state condition, the proportion of the power supplied from the engine-driven electric machine 214 and the battery 216 are adjusted. The controller 12a, in this embodiment, utilizes a comparison of the received characteristic data via the comparator 308 with the stored predetermined parameters in the memory unit 306 in accordance with the set of rules in making this adjustment. Any result of the comparison is provided to the determination module 310. The determination module 310 further utilizes other characteristic data such as, for example, engine-driven electric machine 214 torque limits and speed, as well as total power needed, battery voltage, and battery current limits to output commands and/or limits. These commands and/or limits are provided to the electrical components of the power control system 200 and the load device 220, FIG. 2. In the embodiment shown in FIG. 3A, the output of the determination module 310 of the controller 12a, may be, for example, a machine torque command and limit warning flags in the event any operational limits of the power control system 200 are reached or exceeded.

In the example controller 12a shown in FIG. 3A, the power sharing contribution for the battery 216 is determined as a function of the battery charge level based on the received characteristic data associated with the battery voltage, the battery current, and the battery temperature and also as a function of total load device power demand, which in turn is based on the received characteristic data associated with measured and/or anticipated load device current.

Figure 3B:
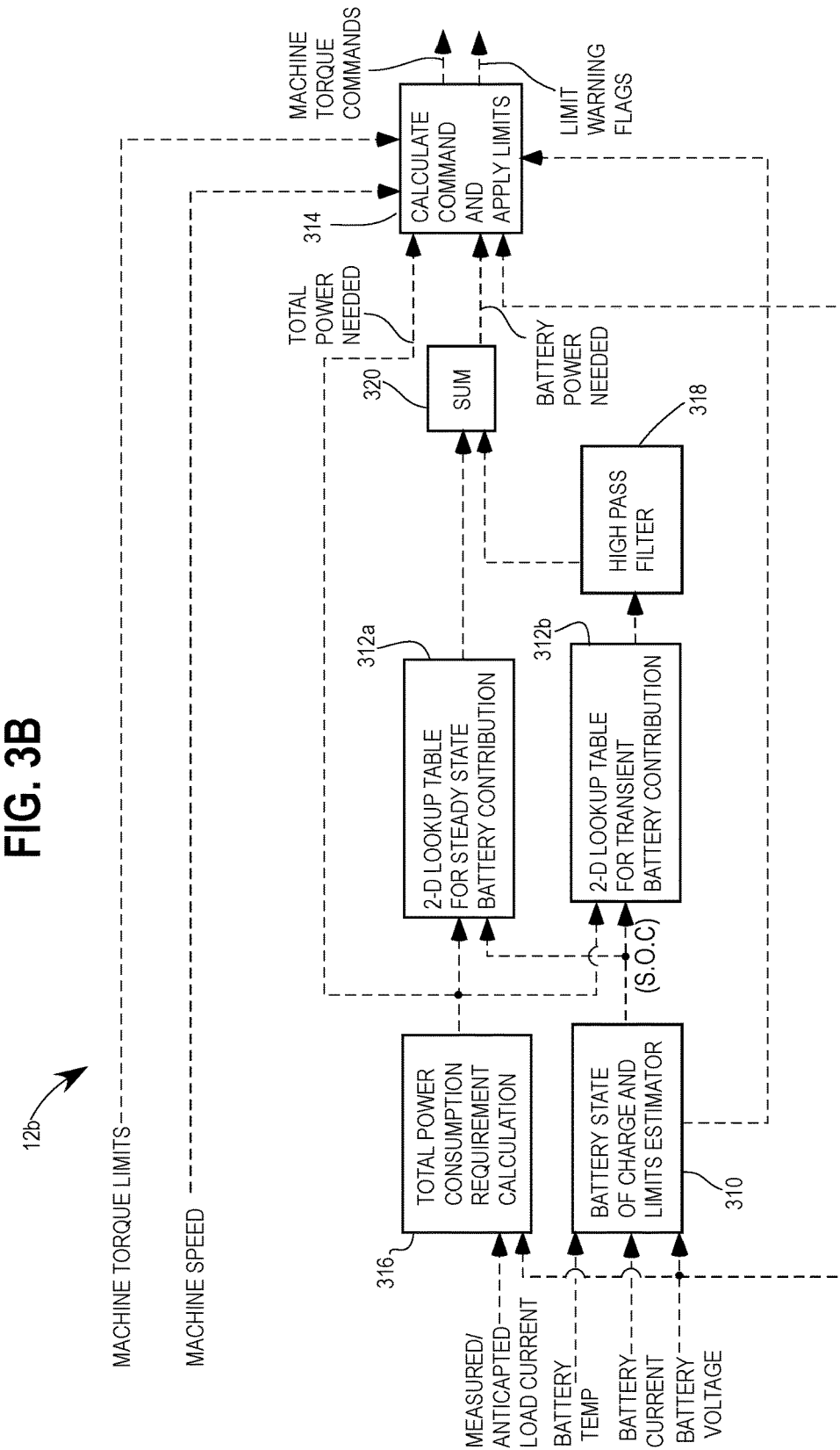
FIG. 3B is a block diagram of another embodiment of the controller shown in FIG. 2.

Referring now to FIG. 3B, an alternative example implementation of a controller in accordance with the embodiment of power control system 200, FIG. 2, is provided. In this particular example, an implementation of the controller is based on and utilizes the battery characteristics. A power sharing determination made by controller 12b in connection with the power control system 200 may be accomplished using, for example, a process such that the power split rules (rule sets 1.1 and 1.2) are performed using two 2-D lookup tables 312a and 312b associated with the steady state and transient battery contributions as a function of the battery charge level and of the total load device power demand. Alternatively, algebraic rules may be used instead of lookup tables, and the algebraic rules may be dependent on any of the states of the power control system 10 instead of (or in addition to) the battery state of charge. Rule set 1.3 may be performed using a high-pass filter 318 on the output of the transient lookup table 312b, and by further summing using a summer 320 at the output of the high-pass filter 318 together with the steady-state lookup table 312a output. The controller 12b then uses the ratio of battery power available vs total power demand to define the power split. This is a way of ensuring that the effect of the transient table 312b decay in time at a rate governed by the filter design. An alternative embodiment could use more than one transient lookup table 312b, with different filters applied to each, or with band-pass filters used. If desired, a low-pass filter could also be used in connection with information stored at steady-state lookup table 312a so that contributions of the low-pass filter are not added during transient conditions above a certain frequency.

The example implementation of controller 12b shown in FIG. 3B may also include the rule set and features 2.1 through 2.7 as set forth above. In this example implementation, an estimator 310 is used to estimate the state-of-charge (SOC) of the battery 216, since this cannot be directly measured. This estimation could be performed by running a real-time battery model (based on the measured current) with error correction based on the measured voltage, or the estimation could be provided via an alternative set of tables or algebraic equations. The estimator 310, in this example, also determines limits for charging and discharging currents, based on the battery temperature and charge level. These limits are applied in the calculation module 314 labeled 'Calculate Commands and apply Limits,' along with limits of allowable machine torque. The rules of rule set 2.3 are also provided in calculation module 314, as the controller 12b will adjust the battery power flow (within limits) in cases where the engine-driven electric machine 14 has reached its limit, and vice versa. If the power demand of the load device 20 cannot be met without exceeding limitations or if any device is at its limit, then a notification will be generated from calculation module 314, as an output flag, providing the capability of features 2.4 and 2.5 as set forth above. The limitations may include power limitations of any of the power sources, power converters, or storage devices such as the engine(s), battery(s), or electric machine(s) that may reach a power flow limit because of temperature conditions. Once these limits are applied after considering the total power needed and battery power needed, the controller 12b determines the desired power split. In this implementation, the desired power split is achieved by sending a torque command from controller 12b to the electric machine 24 (shown in FIG. 2) so that the appropriate power flows through the electric machine 24. The remainder of the power demand for load device 20 may be drawn from the battery 216, since the battery 216 is directly attached to the load bus in the embodiment shown in FIG. 2. An alternative embodiment which inserts a power electronic converter in-between the battery 216 and the load bus (as shown in FIG. 4 below) would need to also send the desired battery current command to that power electronic converter.

Total power consumption module 316, FIG. 3B, determines how much total power (as the sum of the engine-driven electric machine and the energy storage device) is required to meet the power demand of the load device 20 and maintain a desired load voltage. When the battery/load voltage is within acceptable bounds, the total load device power demand nominally equals the measured/anticipated load demand. In this embodiment, however, the total power consumption module 316 also provides for adjustment of the total power demand (up or down) in order to prevent battery/load voltages from exceeding limits. An alternative embodiment which decouples the battery voltage from the load voltage (as shown in FIG. 4 below) may also selectively employ a feedback loop in the total power consumption module 316, to regulate the load voltage, if needed.

Further embodiments of the controller 12 may be achieved by extending the controller 12 to include processing for more than one energy storage device 16 thereby using multiple sets of lookup tables (or algebraic rules) for each energy storage device. If multiple electric machines 24 are used, a set of lookup tables (or algebraic rules) would be used in determining what percentage of the power comes from each electric machine 24, in relation to their total combination. In this example, these rules may be based on the state of the engine 22 and electric machine 24. Furthermore, when the power control system 10 is adaptable to re-configure which energy storage devices 16 or electric machines 24 are connected through busses and/or converters to the loads, the controller 12 may contain rules to operate the switches/contactors needed to perform the reconfigurations. With this approach, additional flexibility and redundancy to the power control system 10 may be achieved at increased complexity.

Figure 4:
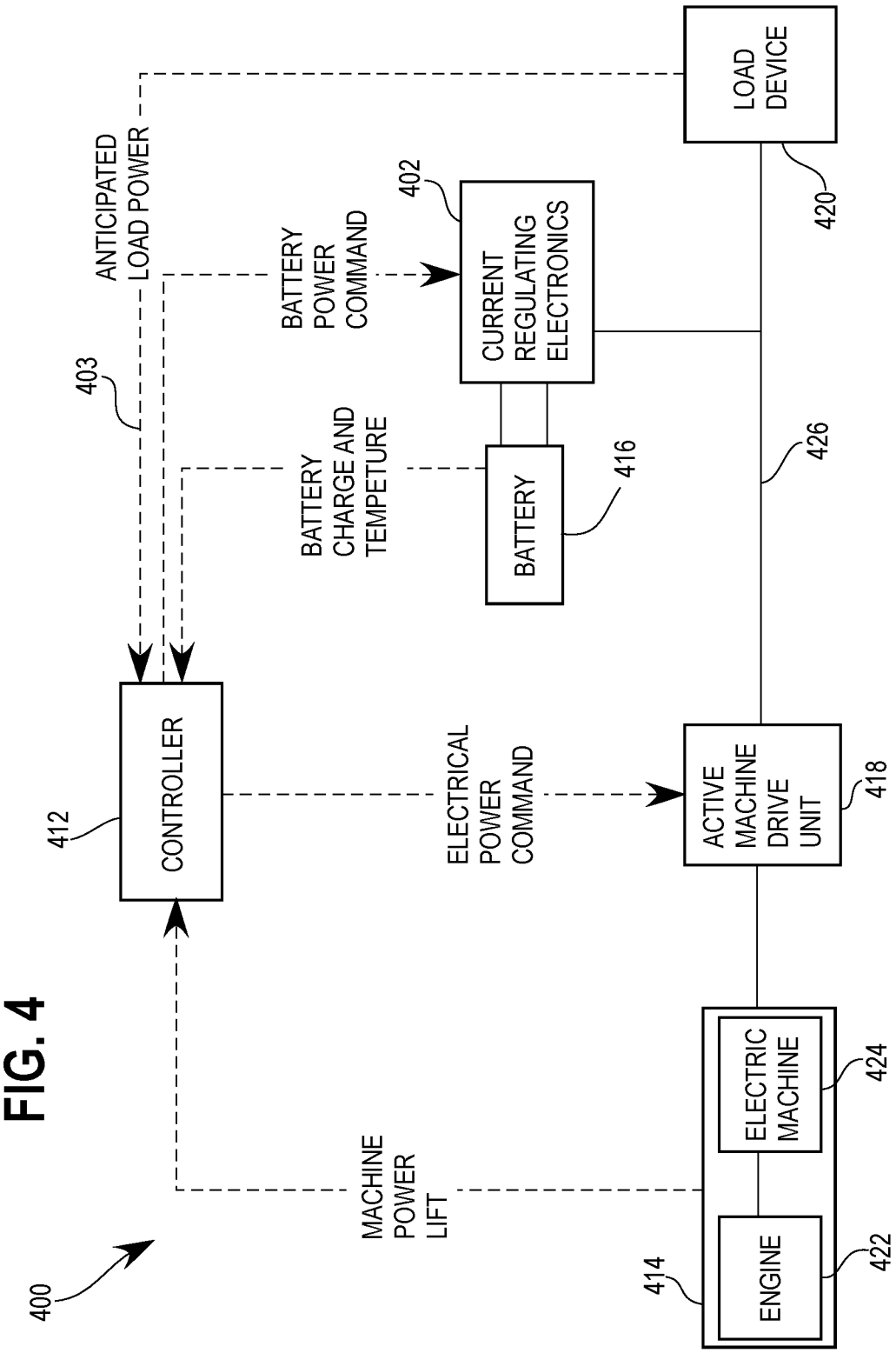
FIG. 4 is a block diagram of yet another embodiment of a power control system.

Referring to FIG. 4, a third embodiment of the power control system 400 is shown. In this embodiment, the power converter may include an active machine drive unit 418. A power electronics converter in the form of current regulating electronics 402 is inserted in-between the battery 416 and the electrical bus 426 supplying the load device 420. In this embodiment, the electrical bus 426 voltage can be regulated independently of the storage level for battery 416, if the load device 420 has requirements for power quality which do not allow for direct battery connection. In this circumstance, the electrical bus 426 may be a DC bus, or it could be an AC bus with a number of phases. Here, the electrical bus 426 voltage is maintained to a desired set-point using active controls in the active machine drive unit 418. In contrast, a desired power flow split determined by the controller 412 is effected by commanding the current regulating electronics 402 that is coupled to the battery 416 to allow a battery current to flow. The remainder of the power demand for load device 420 is provided from the engine-driven electric machine 414 through the active machine drive unit 418, which it must converge to in order to maintain the desired load bus voltage. As shown in FIG. 4, characteristic data in a form of an anticipated load power signal 403 containing the expected load device 420 power demand value is received by the controller 412. This facilitates a determination of the power sharing by the controller 412 more expeditiously when not having a real-time measured value of the power demand for the load device 420 and when not having current sensors or other measurement devices placed at the load device 420. The bandwidth at which power flow to/from the battery 416 can be regulated is dependent on the current regulating electronics 402 bandwidth. Other aspects of this embodiment may include capacitors, machine-driven flywheels, or some other energy storage device in addition to or as alternatives to the battery 416.

Figure 5:
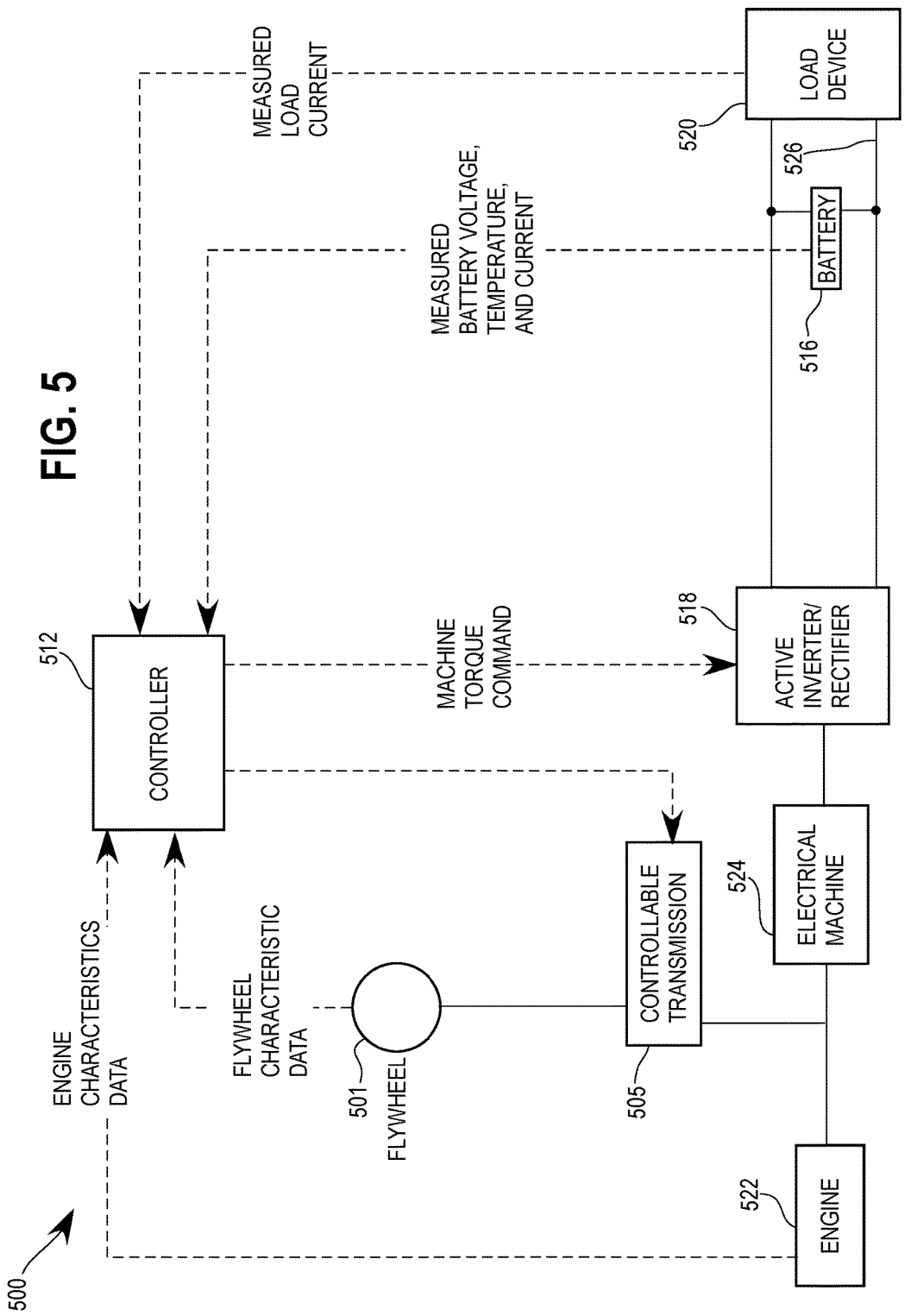
FIG. 5 is a block diagram of another embodiment of a power control system.

Referring to FIG. 5, in a further embodiment of the power control system 500 both electrical and mechanical energy storage is used. In this embodiment, a flywheel energy storage 501 is shown having a mechanical linkage to the engine 522 through a controllable transmission 505. In another embodiment, the electric machine 524 and the inverter/rectifier 518 may be used to link the flywheel energy storage 501 to the electrical load bus 526 instead of linking it mechanically to the engine 522. Considerations of size, reliability, efficiency, and cost are taken into account in deciding as to whether to link the flywheel energy storage 501 to the electrical load bus 526 or to the engine 522 through the controllable transmission 505. In this embodiment, the battery 516 is also used for additional energy storage on the electrical load bus 526. This embodiment allows the battery 516 and flywheel energy storage 501 sizes to be optimized based on their operational characteristics. For example, flywheels can store large amounts of energy in small volumes, but may not have as much power handling capability as certain battery chemistries. The battery chemistry could be focused on power density rather than energy density, since the flywheel is already present to store energy. This balancing of device sizes would be specific to each power control system embodiment. Different combinations of electrical, chemical, kinetic, thermal, or other energy storage means could be used in various embodiments of the power control system in order to best meet the needs of that particular application.

Other embodiments may include multiple load devices on multiple different load busses, multiple energy storage devices, multiple electric machines driven by different power offtake shafts of a single engine, or multiple electric machines driven by multiple engines altogether.

Referring to FIG. 6, an example process for initialization and performance of the power control system 10 is shown. By way of example, at step 602, determinations regarding requirements of various load device(s) features are made. These load device features may include at least voltage, pressure, speed, current, power, torque, flow, transient characteristics/limits, or steady-state characteristics/limits. At step 604, particular engine and electric machine combinations are selected to at least meet a long duration operation of the load device(s) by taking into account any margins for the operation of the selected engine and electric machine. At step 606, energy storage requirements in terms of power and energy capacities for transient and short duration operations of the load device(s) are determined. At step 608, topology of the energy storage device(s) such as the batteries, the ultra-capacitors, and the flywheels are selected. At step 610, at least one power distribution architecture from a number of alternative power distributions is selected. At step 612, as the power distribution architecture is selected, then power conversion and interconnection devices are selected as transmission and power transfer parts of the power distribution architecture. At step 614, transient and steady-state performance characteristics and limits of certain components such as the engine, the electric machine, the storage device, and the load device, among others, are determined. At step 616, based on certain considerations such as for example, weight, cost, response time, performance, reliability, and efficiency of the components, the electrical system performance goals are determined. At step 618, certain constraints such as the predetermined parameters, for example, device/component ratings and the power control system limits are established.

At step 620, the set of rules and features utilized by the controller to control the current flow and provide a tuneable power sharing between the devices/components at the steady-state and the transient conditions are developed. At step 622, optimizations may be performed using system analysis tools such as modeling and simulations to tune the controller gains and achieve desired system operation results. At step 624, based on the modeling and simulations, a determination is made as to whether the operation of the controller is optimal. If the performance of the controller is not optimal, then the process is repeated from step 616 to achieve the optimal performance for the controller. In the alternative, if the performance of the controller is optimal, then in step 626 an inquiry is made regarding whether the power control system performs optimally based on the selected power control system architecture. In the event the power control system architecture does not perform optimally, then the process repeats from step 604. As a final step 628, a task of assembling the electrical components and testing for a desired power sharing operation by the power control system is performed.

The design options for the power control system as described herein are not limited to any specific application and/or a specific load device.

INDUSTRIAL APPLICABILITY

As provided herein, the power control system may be employed in connection with a load device, and more specifically the power control system is utilized to determine power sharing between an engine-driven electric machine and an energy storage unit for meeting a total load device power demand. The use of the terms "a" and "an" and "the" and similar references in the context of describing the disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:
1. A power control system, comprising:
an energy storage device;
an engine-driven electrical machine;
a power converter electrically coupled to the energy storage device and the engine-driven electrical machine, wherein the power converter is configured to supply a total load power to an electrical load device; and
a controller coupled to the power converter, the controller receives characteristic data from at least one of the energy storage device, engine-driven electrical machine, and the electrical load device,
wherein the characteristic data includes an anticipated load of the electrical loading device, and responsive to receiving the anticipated load, the controller is adapted to adjust first and second proportions of the total load power that are supplied by the energy storage device and the engine-driven electrical machine, respectively.

2. The power control system of claim 1, wherein the controller comprises:
a receiver configured to receive the characteristic data;
a processing unit coupled to the receiver including:
a memory unit having stored predetermined parameters therein associated with the energy storage device, the engine-driven electrical machine, and the electrical load device;
a comparator that compares the received characteristic data with the stored predetermined parameters using a set of rules; and
a determination module that provides output signals in response to the comparison of the received characteristic data with the stored predetermined parameters by the comparator in accordance with the set of rules.

3. The power control system of claim 2, wherein the controller adjusts the first and second proportions based on a status of the electrical load device.

4. The power control system of claim 3, wherein the controller is configured to identify when the status of the electrical load device is one of a transient condition and a steady state condition, wherein the first proportion is larger during the transient condition than during the steady state condition, and wherein the transient condition is during an increase in power demand of the electrical load device.

5. The power control system of claim 4, wherein the second proportion is larger during the steady state condition than during the transient condition.

6. The power control system of claim 5, wherein during the steady state condition, the second proportion is larger than the first proportion.

7. The power control system of claim 4, wherein during the steady state condition, the energy storage device is recharged to a predetermined value over an energy storage device time constant period.

8. The power control system of claim 2, wherein the controller adjusts the first and second proportions based on the received characteristic data associated with the energy storage device, the engine-driven electrical machine, and the electrical load device.

9. The power control system of claim 8, wherein the stored predetermined parameters associated with the energy storage device include at least one of a maximum current rating, a minimum state of charge, a maximum state of charge, a minimum voltage, a maximum voltage, a maximum temperature, and charge/discharge time constants.

10. The power control system of claim 2, wherein the controller selectively commands the power converter to permit a backflow of a portion of power from the electrical load device to at least one of the energy storage device and the engine-driven electrical machine.

11. The power control system of claim 10, wherein the controller adaptively directs a multidirectional flow of power between the engine-driven electrical machine, the energy storage device, and the electrical load device based on the received characteristic data.

12. The power control system of claim 11, wherein the power converter further comprises reconfigurable bus connections, wherein the reconfigurable bus connections are adapted to supply the multidirectional flow of power between the engine-driven electrical machine, the energy storage device, and the electrical load device.

13. The power control system of claim 12, wherein the power converter comprises an active machine drive unit including at least one of a rectifier and an active inverter.

14. The power control system of claim 2, wherein the electrical load device is at least one of a high power optical load, thermal management system load, avionics equipment, and military equipment.

15. The power control system of claim 14, wherein the engine in the engine-driven electrical machine is at least one of a gas turbine engine, a diesel engine, and a gasoline engine.

16. The power control system of claim 2, wherein the energy storage device comprises at least one of a battery, a flywheel, and a capacitor.

17. The power control system of claim 1, wherein the energy storage device, the power converter, and the load device are directly coupled to a load bus, wherein the power converter includes an active inverter/rectifier unit electrically disposed between the energy storage device and the engine-driven electrical machine, and the controller sends a torque command through the active inverter/rectifier unit to control operation of the engine-driven electrical machine.

18. The power control system of claim 1, wherein the controller adjusts the first proportion of power supplied by the energy storage device by sending a torque command to the engine-driven electrical machine.

19. A method for providing power sharing in a power control system comprising:
selecting an energy storage device configured to supply a first portion of power of a total load power;

selecting an engine-driven electrical machine configured to supply a second portion of power of the total load power;
selecting a power converter configured to supply the total load power to an electrical load device; and
providing a controller configured to control the supply of the first portion of power and the second portion of power based on an anticipated load of the electrical load device.

20. The method of claim 19, further comprising:
establishing constraints associated with at least one of the energy storage device, engine-driven electrical machine, and the electrical load device;
providing the established constraints as predetermined parameters to the controller;
providing characteristic data from at least one of the energy storage device, engine-driven electrical machine, and the electrical load device to the controller; and
determining transient and steady state performance characteristics of the energy storage device, engine-driven electrical machine, and the electrical load device.

21. The method of claim 20, further comprising:
developing a set of rules based on the predetermined transient and steady state performance characteristics of the energy storage device, engine-driven electrical machine, and the electrical load device; and
providing the set of rules, predetermined parameters, and the characteristic data to the controller.

22. The method of claim 21, further comprising:
determining a power sharing proportion of a power sharing amount of each of the first portion of power and the second portion of power by comparison of the characteristic data with the predetermined parameters based on the set of rules.

* * * * *